PATENTED JUN29 1971　　　3,589,053

PATENTED JUN29 1971    3,589,054
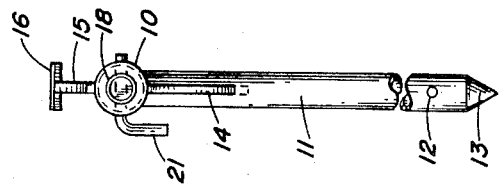
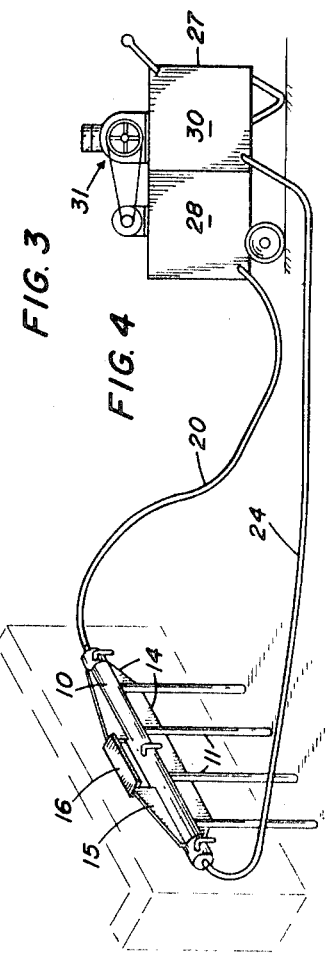
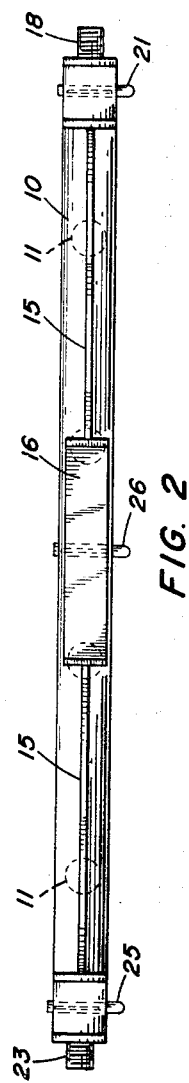
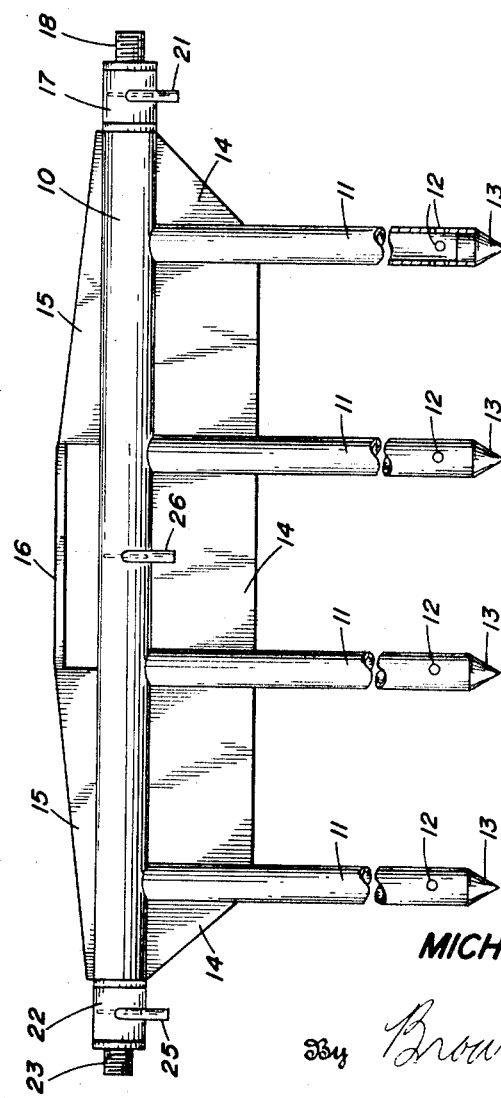
Inventor
MICHAEL C. PASCUCCI
By Browdy and Neimark
Attorneys 3,589,054

METHOD OF MULTIPLE INJECTION

This application is a division of copending application Ser. No. 787,514 filed Dec. 27, 1968.

The present invention relates to a method of treatment of soils and to handtools which are used in the treatment of soil and especially the soil which is located around the foundation of a house or other structure.

In the past many devices have been produced having as their general purpose the injection of water, or other fluid solution, into the soil by means of jetlike devices. Popular among these prior art devices are the handtools which are connected to a garden hose, and having a probe, or vertical tine, which is stuck down into the ground to aerate and water the roots of shrubbery and trees. Frequently, a bottle or reservoir of liquid fertilizer is attached to the device for feeding the shrubbery while it is being watered.

Another application of these prior art devices is in the treatment of house foundations for the elimination of and protection against, termites and also for waterproofing. In this procedure, a probe, having a plurality of holes at its lower extremity, is inserted about 5 or 6 feet into the ground near the foundation of the house being treated and a solution, poisonous to the termites, or effecting the waterproofing, is pumped through the probe and into the soil. The probe is then withdrawn, moved a few feet, and reinserted until the entire building has been circled. The continual reinsertion of the probe at the intervals indicated is most important to insure that the areas saturated by the solutions overlap each other to thereby guarantee complete protection from the termites or complete waterproofing. This is a time-consuming and laborious procedure which often must be repeated several times if the infestation is so advanced as to require the application of more than one type insecticide and if both termite-proofing and waterproofing are to be accomplished.

Further, in the past the termite-proofing and waterproofing of soils have been accomplished at different times by different companies. It has now been determined that the incidence of termite infestation is highly related to the water passing through a foundation since termites need water to live. Accordingly, it is essential in treating for termite control that waterproofing be conducted simultaneously.

The present invention offers considerable improvement over the prior art devices and methods by overcoming the disadvantages and undesirable features inherent in their structure and method of operation. For example, the invention discloses a handtool having a plurality of probes rather than a single one, each of the probes being spaced the proper distance from its neighbor to insure saturation of the soil between them. In this way an operator of the device has to make far fewer insertions in the ground to cover an entire foundation, and therefore the invention is far less time consuming to accomplish the same results as obtained by prior art devices. The invention has the further advantage of providing for the simultaneous application of more than one solution, if desired, such as termite-proofing and waterproofing solutions, by the manipulation of the valves located on the manifold. By closing the middle valve and opening the two end valves it is possible to dispense a different fluid through each pair of probes simultaneously. In the alternative, if the middle valve is opened and one of the end valves closed, then all four probes will dispense the same fluid.

An object of the invention is the provision of a handtool for treating soil.

Another object is the provision of a handtool having a plurality of probes for insertion in the soil.

Still another object is the provision of handtool which can simultaneously inject more than one kind of fluid.

Yet another object is the provision of a handtool which is capable of dispensing one fluid through half of its probes and another fluid through the other half of its probes, or if desired, one fluid through all of its probes.

Still another object of the invention is to provide a method of simultaneously termite-proofing and waterproofing the soil surrounding the foundation of a building.

Other object and many of the attendant advantages of the invention will be readily appreciated as the same becomes better understood by reference to the following detailed description when considered in connection with the accompanying drawings in which like reference numerals designate like parts throughout the figures thereof and wherein:

FIG. 4 is a view of the invention showing it attached to a cart carrying the fluids to be dispensed.

Figure 1:
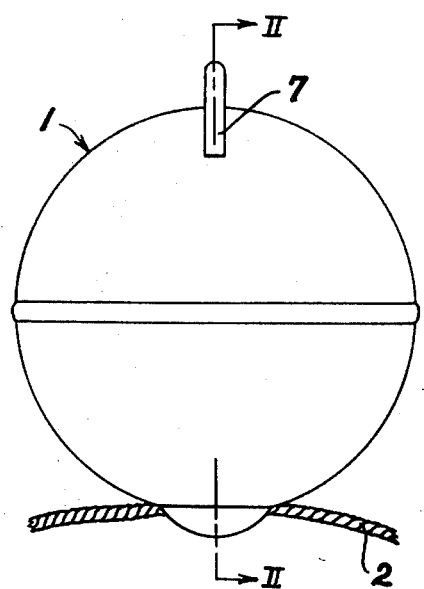
FIG. 1 is a side elevation of the invention.
Figure 2:
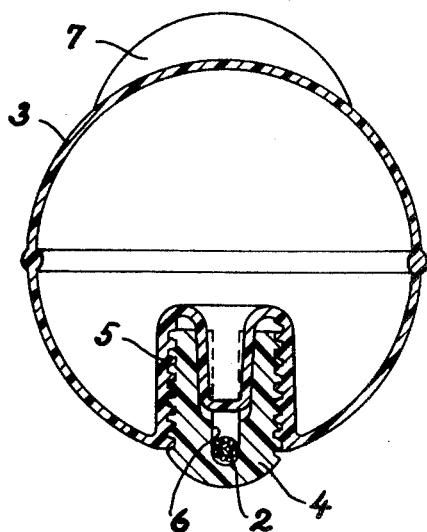
FIG. 2 is a plan view of the invention.
Figure 3:
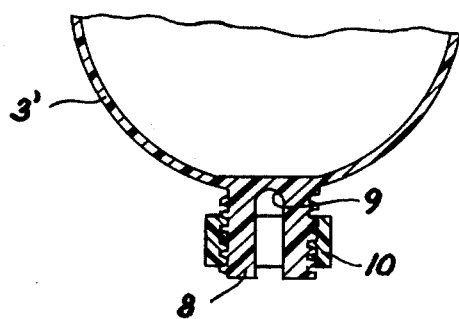
FIG. 3 is an end view of the invention.

Referring now to the drawings there can be seen in FIG. 1 a side elevational view of the structure embodying the inventive concept. There is a hollow, horizontally extending manifold 10 which may be of any desired diameter and length to stay within the realm of portability. Suggested dimensions would be for manifold 10 to be in the neighborhood of 24 inches long and of 1¼ inch diameter pipe, but these dimensions are by no means limitations.

Positioned equidistantly along the length of manifold 10 and extending at right angles to it there are a plurality of hollow probes 11, shown here as four in number although there may be any number without changing the concept of the invention. Probes 11 may be of any convenient length, but are shown here to be in the neighborhood of 5 feet and to be made of ¾-inch diameter pipe. Probes 11 are joined to manifold 10 by welding, threading, or the like, so that any fluid passing through the hollow manifold will likewise flow through the probes, and out through holes 12 which are located near the ends of the probes. It will be noted that holes 12 are drilled through probes 11 in at least two directions, thereby producing at least four apertures for the emission of the fluid. The lowermost ends of the probes are fashioned into a point 13 to facilitate their insertion into the ground.

In order to add strength and stability to the device there is provided a metallic webbing 14 which is attached by any convenient means to the underside of manifold 10 and extending vertically a short distance down the sides and between the individual probes 11. Webbing 14 is usually of sheet metal and of sufficient gauge to give structural strength to the probes. Atop manifold 10 and extending along most of its length there is another structural plate 15 having a horizontal section 16 which serves as a handle.

At the right end of manifold 10 there has been inserted a threaded nipple 17, one end of which fits into the manifold 10 and the other end of which is threaded at 18 to receive a supply hose 20. Also positioned at the right end of manifold 10 and at the inner end of nipple 17 there is an off-on valve 21 which may be of any desired design for turning on and off the fluid flowing through supply hose 20 and into the right end of the manifold.

The left end of manifold 10 has an arrangement similar to that on the right end; namely, a threaded nipple 22 which fits the manifold, a threaded portion 20 of the nipple for receiving a second supply hose 24, and another off-on valve 25 for controlling the flow of fluid through supply hose 24 into the left end of the manifold.

Midway along the length of manifold 10 there is positioned a third valve 26 which controls fluid flow between the two halves of the manifold. Thus, in its closed position valve 26 separated the two halves of the manifold so that one fluid flows through the other two probes. In its open position, one fluid can flow through all four probes.

Turning to FIG. 4 there can be seen an overall view of the entire equipment. Fluid is supplied from a wheeled tank, or cart 27 having two compartments 28 and 30, with supply hoses 20 and 24 attached thereto. A compressor 31, which may be either gasoline or electric motor driven, is mounted on top of the cart 27 to force the flow of the fluids from compartments 28 and 30 to probes 11.

From a perusal of the structure described it is clear that the operation of the invention provides for grasping the handle 16 and forcing the probes 11 into the ground near a foundation, which is being treated for termites and/or waterproofing, for example. When compressor 31 is started it forces the fluid stored in compartments 28 and 30, out through hoses 20 and 24 and into the two ends of manifold 10. If it is desireable to have both fluids applied simultaneously to the foundation, then end valves 21 and 25 are both opened, but valve 26 is kept in its closed position. In this situation, fluid from hose 20 is ejected by the two right-hand probes 11 while fluid from hose 24 is ejected by the two left-hand probes. Should it be more desirable to have the same fluid ejected by all four probes then either valve 21 or valve 25 is closed and valve 26 is put in its open position.

From the above description of the structure and operation of the invention, it is clear that the device offers many improvements over prior art grouting assemblies in that there is disclosed an easily portable, easily manageable grouting assembly which can quickly treat a building foundation through the use of multiple probes, and one which may also be used to simultaneously apply more than one fluid.

Thus, if the solution in compartment 28 is a termite-proofing solution and the solution in compartment 30 is a waterproofing solution, by opening both end valves 21 and 25 and closing valve 26, the termite-proofing solution can be ejected through hose 20 through the two right-hand probes 11 while the waterproofing solution can be simultaneously ejected through the hose 24 through the two left-hand probes.

The method which constitutes the present invention thus provides for simultaneously applying to the soil a termite-proofing solution and a waterproofing material through a single device without intermixing of the two liquids. This method results in an improved action on the soil which effectively removes the incidence of termite infection.

Obviously, many modifications and variations of the present invention are possible in the light of the above teachings. It is therefore to be understood, that within the scope of the appended claims, the invention may be practiced otherwise than as specifically described.

I claim:

1. A method of simultaneously termite-proofing and waterproofing the soil about the foundation of a building which comprises simultaneously inserting along a single plane at desired intervals into the soil to be treated a plurality of probes connected to a single manifold, said probes being urged into the soil by a downward force applied to said manifold, simultaneously pumping a termite-proofing liquid and a waterproofing liquid through said single manifold and said plurality of probes into the soil to be treated without intermixing the two liquids in the manifold or the probes, one of said liquids being pumped through a first plurality of said probes and the other of said liquids being pumped through a different plurality of said probes, and then removing said probes from the soil and repeating the aforementioned steps until the circumference of the building has been so treated.